July 7, 1970

H. C. WRIGHT 3,518,901

PORTABLE HEAVY DUTY OFFSET DRILLING ATTACHMENT

Filed July 22, 1968

INVENTOR.
HOWALD C. WRIGHT
BY
Gerald R Hershberger
ATTORNEY

July 7, 1970 H. C. WRIGHT 3,518,901
PORTABLE HEAVY DUTY OFFSET DRILLING ATTACHMENT
Filed July 22, 1968 2 Sheets-Sheet 2

INVENTOR.
HOWARD C. WRIGHT
BY
Gerald R Hershberger
ATTORNEY

@# United States Patent Office 3,518,901
Patented July 7, 1970

1

3,518,901
PORTABLE HEAVY DUTY OFFSET DRILLING ATTACHMENT
Howald C. Wright, 27935 Vogt,
St. Clair Shores, Mich. 48081
Filed July 22, 1968, Ser. No. 746,668
Int. Cl. B23b 39/12, 47/00
U.S. Cl. 77—27                           2 Claims

ABSTRACT OF THE DISCLOSURE

This disclosure relates to a portable heavy duty offset drilling attachment for use with electric drills, and more particularly for use with the heavier floor mounted heavy duty drilling apparatus such as radial drill presses and boring mills.

---

In the past, in the machine tool industry, there has been no practicable method for drilling blind holes or holes on the inside walls of angle pieces, such as U-shaped channels requiring holes to be drilled in opposite walls thereof. Such holes were usually drilled from the outside of such angle pieces, and pieces having thick flanges made drilling of such holes very difficult, and the operation was also very time consuming because each hole had to be spotted first on the outside of that part. The instant device has eliminated this problem by facilitating direct drilling from the inside of such channels.

It is therefore an object of my invention to provide a heavy duty portable offset drilling attachment for floor mounted drilling machines which is exceptionally rigid, although compact in arrangement of parts, and which is capable of drilling or boring holes in offset manner in heavy machine parts.

Another object of the invention is to provide an offset drilling attachment wherein the drill bit actuating mechanism travels independently of the actuating mechanism casing.

A further object of this invention is to provide an offset drilling attachment for a drilling machine, such attachment having a rigid base or support for mounting directly to the head of the drilling machine in a fixed manner and an offset drill bit actuating mechanism that is operable to be guided and moved in operational manner in cooperation with the linear and rotary motion of the chuck and spindle of the drilling machine.

It is a further object of this my invention to provide a heavy duty portable offset drilling attachment for heavy duty floor mounted drilling machines such as radial drilling machines which have a rigid heavy duty base operable to be fixedly attached to the drill head of the machine and provided with machine ways for guiding an offset drill bit actuator which is connected to the spindle of the radial drill press, the drill head of the machine and the attachment operable to be moved simultaneously on the radial arm of the drill press horizontally to bring the offset actuator of the attachment into position for drilling a blind opening in a part piece.

The foregoing, together with other objects and advantages which will become subsequently apparent, reside in the details of construction and operation as more fully hereinafter described and claimed, reference being had to the accompanying drawing a part hereof, wherein like numerals refer to like parts throughout, and in which:

2

Figure 1:
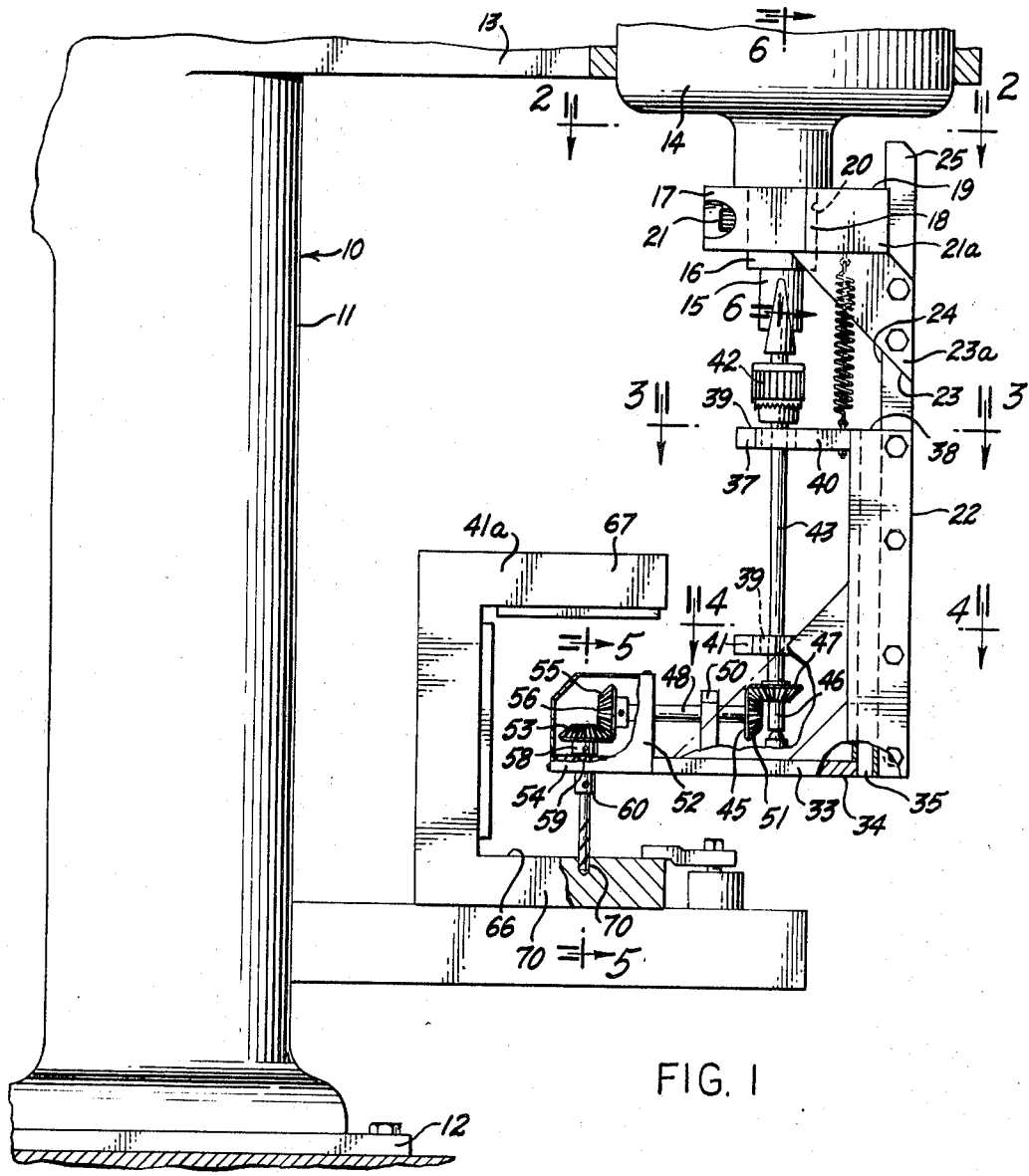
FIG. 1 is an elevational view showing the device mounted on a radial drilling machine in operation drilling a blind bore.
Figure 2:
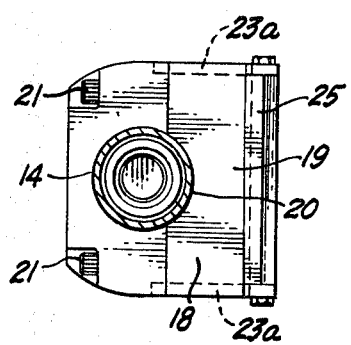
FIG. 2 is a sectional view taken along lines 2—2 of FIG. 1, showing the attachment of the device to the movable sliding head of the radial drilling machine.
Figure 3:
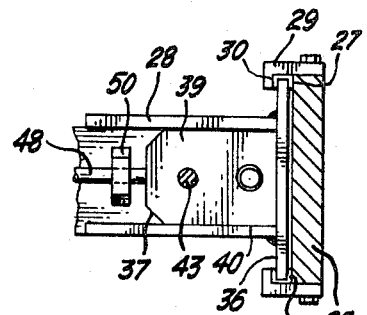

FIG. 3 is a sectional view taken along lines 3—3 of FIG. 1, disclosing the arrangement of the driving mechanism and slide mechanism.

Figure 4:
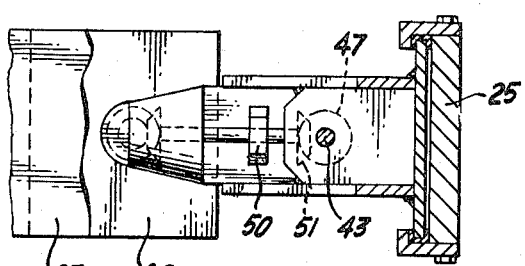

FIG. 4, is a sectional view taken along lines 4—4 of FIG. 1, showing the relationship of the driving shafts, pillow blocks, and other cooperating parts.

Figure 5:
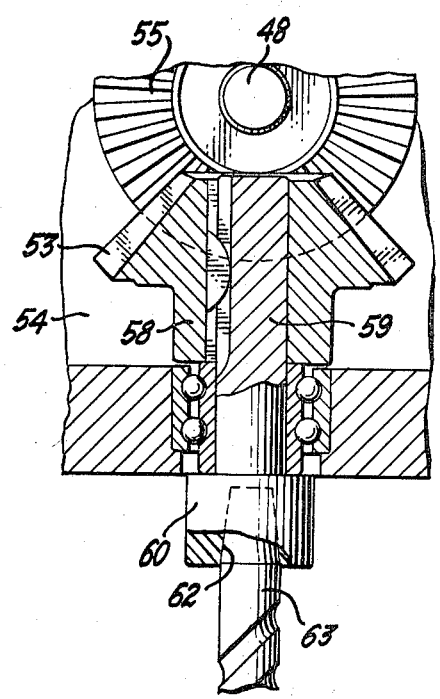

FIG. 5 is a sectional view taken along lines 5—5 of FIG. 1, showing the relationship of the bevel bearing and the taper drive.

Figure 6:
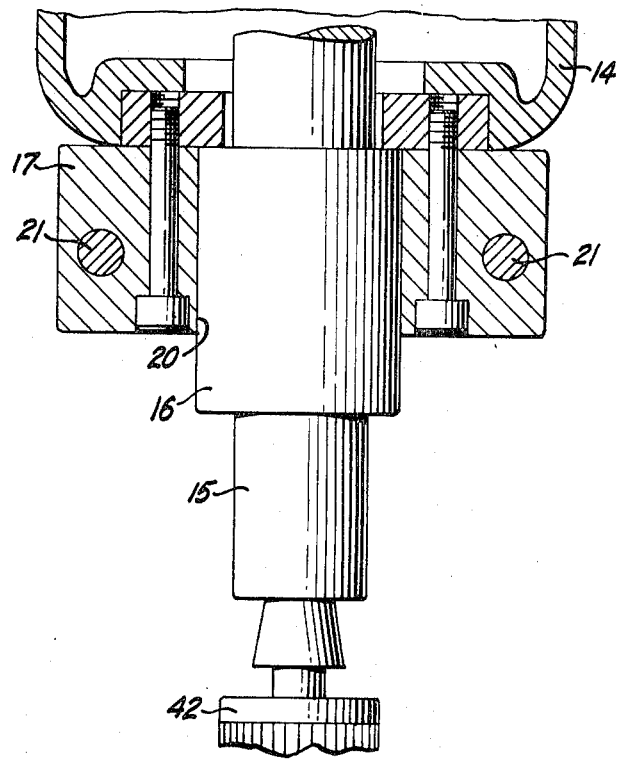

FIG. 6 is a view taken along lines 6—6 of FIG. 1, showing an alternative method of attaching the device to the radial drilling machine.

Referring now to the drawings in detail, wherein like numerals refer to like throughout, and for the purpose of illustration, we have disclosed a preferred embodiment of the invention, the numeral 10 designates a radial drilling machine of the conventional type, which includes a power unit (not shown), a column 11 vertically positioned with respect to the base 12, a radial arm 13, mounted on said column for radial rotation thereon, and a radial drilling machine head 14, carried by said arm, and movable laterally thereon. The head 14 is provided with a spindle 15 which is driven by said power unit for performing work. The spindle 15 projects from a hub 16 provided by the head 14, and to this hub a housing 16 is secured in stationary position for mounting the instant device by a cap 17 having a semicircular bore 18 of substantially the same diameter as said hub, a mounting block 19 having a semicircular bore 20 matching the semicircular bore 18 of said cap, and bolts 21 passing through said cap on each side of said bore threaded into said block, drawn down tightly to clamp said block and cap to said hub between said semicircular bores. The rear vertical edge 21a of said block 19 is fixedly secured to the front face 24 of a vertically disposed elongated base plate 22 adjacent the top edge 25 thereof by welding or other suitable means. Gussets 23 are fixedly secured to the sides of said base plate and said mounting block to hold said block in normal relationship to said base plate. The lower portion 26 of said base plate as shown in FIG. 5 provides a mounting surface 27 for supporting the offset slide portion 28 of the device. Said lower portion of said base is provided with elongated, vertically aligned guides 29 mounted on the sides 23a thereof oppositely disposed to each other. Said guides have inwardly turned walls 30 to fixedly retain bearing plates 31 between said mounting surface 27 for mounting said slide portion slidably to said base. The vertically disposed flange 32 of the vertical support member 36 said slide portion are slidably engaged by said bearing plates securing said slide portion to said base in a manner allowing vertical up and down movement only of said slide portion with relation to said base bearings. The lower offset portion 33 of said slide portion is defined by an elongated offset plate 34 fixedly mounted or welded on the lower extremity 35 of said vertical support member horizontally in cantilevered relationship to said vertical support member 36. A first bearing block 40 comprising a plate member 37 mounted fixedly to the upper edge 38 of said vertical support member 36 and having a rotary bearing member 39 mounted in said plate member 37, said bearing member located centrally with the axis of the spindle of said drilling machine. Downwardly from said first bearing block a second bearing block 41 is fixedly mounted on said vertical support member in spaced relationship to said first block to provide stability and access to the part 41a, said second bearing block likewise having a rotary bearing 39 mounted therein. Said bearing members are arranged to receive a first shaft member 43 vertically aligned in said bearing members, said first shaft member arranged to be received into the jaws (not shown) of the drilling machine chuck 42 for rotation thereby. A set of miter gears 45 are positioned adjacent the lower end 46 of said first shaft member, one of said miter gears 47 fixedly mounted on said first shaft member below the second bearing mount 41, and the other bevel gear 51 fixedly mounted on the horizontally disposed second shaft member 48 at right angles to said first shaft member, a third bearing mount or block 50 is fixedly secured to said elongated offset plate 34 adjacent said bevel gear 51, a fourth bearing mount 52 is mounted forwardly of said third bearing mount for rotatably securing said second shaft to said offset plate, and forwardly of said fourth bearing mount and adjacent thereto a second set 53 of engaged miter gears are positioned at right angle drive to each other adjacent the forward extremity 54 of said offset plate. One of said second set of gears 55 is fixedly mounted on the forward end 56 of said second shaft, and the second gear 57 is fixedly mounted to the top end 58 of a tool receiving rotary shaft 59 which is vertiaclly journaled in said offset plate 34 by rotary thrust bearing 65. As shown in FIG. 5, the lower end 60 of said shaft 59 extends below the bottom surface 61 of said plate 34 sufficiently to accommodate a tapered socket 62. The tapered socket 62 is made as short in depth as possible for greater accessibility to drill blend holes in channels or similar part pieces. A drill 63 is held in said socket for use in said device as will now become apparent from the operation and description thereof. The base 64 of the drilling machine 10 is illustrated as having a large part piece 41a clamped thereto in a manner that the inside wall 66 is inaccessible from the top by usual drilling methods. However, I have solved the problem of drilling these holes with my device, since when it is used the offset portion 33 will enter between the legs 67 of the part piece 65 and said slide portion may be adjusted laterally and radially to a predetermined location within said legs 67 for drilling by moving the head 14 traversely on the radial arm 13, and the arm 13 radially about column 11 providing universal adjustment to the device to drill or bore holes or openings 70 in any quadrant. Vertical up-and-down movement of the drill is provided by the movement of the spindle sleeve 68 and the spindle 69 which rotates causing said chuck both to rotate and traverse vertically up and down moving slide portion 28 up and down drilling said opening or bore 70.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a radial drilling machine having a vertical column, a radial arm mounted on said column for movement radially about said column, and traversing up and down on said column, a drill head mounted on said arm for movement laterally on said arm to and from said column, a spindle sleeve mounted vertically in said head, and a rotatable machine spindle carried by said sleeve, said spindle having means for holding a tool at its lower extremity, a readily detachable heavy duty portable offset drilling attachment for lower end portion of the head of said drilling machine comprising;
   a vertically disposed base;
   means for attaching said base to the lower end portion of said head in stationary position;
   a tool carrying slide mounted on said base and restricted to vertical up and down movement only, said slide having an offset portion cantilevered outwardly from said base and for access to blind openings;
   a vertical shaft member rotatably mounted on said slide in axial alignment with said spindle, and in driving connection therewith;
   a horizontal shaft rotatably mounted on the offset portion of said slide in driving connection with said vertical shaft;
   a vertically mounted stub spindle rotatably mounted adjacent the forward extremity of said offset portion in driving connection with said horizontal shaft, the lower end of said stub spindle extending below said offset portion and having means for holding a work performing tool provided at said lower extremity of said stub spindle;
   said offset drilling attachment operable to be moved laterally and radially in response to movement of said radial drill arm and said drill head, and said slide portion operable to be traversed vertically up and down in response to movement of said spindle sleeve, and said horizontal, vertical, and stub spindle operable to be rotated in response to rotation of said drilling machine spindle to drill a blind bore in a work piece.

2. In a readily detachable heavy duty portable offset drilling attachment for a radial drilling machine having a vertical column, a radial arm mounted on said column for movement radially about said column, and traversing up and down on said column, a drill head mounted on said arm for movement laterally on said arm to and from said column, and a rotatable tool holding machine spindle operable to traverse up and down vertically in said head;
   a generally elongated base member having a generally flat front wall;
   means for attaching said base to the lower end portion of said head in stationary position;
   a tool carrying slide mounted on said base front wall;
   machine ways restricting said slide to linear movement only on said base, said slide having an offset portion cantilevered outwardly normal to said base for access to a blind opening;
   a first input shaft member rotatably mounted on said slide for axial alignment with the spindle of said drilling machine and operable to be driven by said machine spindle;
   a second shaft rotatably mounted on the offset portion of said slide in driving connection with said first shaft and positioned at right angles thereto;
   an offset output spindle rotatably mounted adjacent the forward extremity of said offset portion in driving connection with and normal to said horizontal shaft, the lower end of said stub spindle extending below said offset portion for operating a cutting tool at said lower extremity of said spindle, the ratio of the output spindle to the input spindle being 1—1 so that the feeds and speeds as determined by the feed and speed selector will not be changed by said drilling attachment.

References Cited
UNITED STATES PATENTS

| | | | |
|---|---|---|---|
| 365,850 | 7/1887 | O'Neill | 77—55 |
| 3,162,091 | 12/1964 | Keller | 77—55 XR |

FRANCIS S. HUSAR, Primary Examiner

U.S. Cl. X.R.

77—55; 144—93